United States Patent [19]

Schneider

[11] 4,436,343
[45] Mar. 13, 1984

[54] FRAMELESS FOAM BASE FOR UPHOLSTERED SEATING FURNITURE AND METHOD

[76] Inventor: Charles Schneider, 314 South 67th St., Omaha, Nebr. 68132

[21] Appl. No.: 323,190

[22] Filed: Nov. 20, 1981

[51] Int. Cl.³ .......................... A47C 7/18; A47C 7/24
[52] U.S. Cl. ............................ 297/456; 297/DIG. 1; 156/163; 156/216; 403/205; 403/267
[58] Field of Search ........ 297/456, 443, 454, DIG. 1, 297/DIG. 2; 312/140; 248/205.3, 205.4; 5/481; 156/163, 216, 229, 304.3; 403/205, 267, 403, 266

[56] References Cited

U.S. PATENT DOCUMENTS

| | | | |
|---|---|---|---|
| 2,220,469 | 11/1940 | Wouters | 312/140 X |
| 2,568,527 | 10/1951 | Weiss | 297/456 X |
| 2,975,092 | 3/1961 | Hagerty | 156/216 X |
| 3,188,142 | 6/1965 | Probst | 297/456 |
| 3,553,749 | 1/1968 | Majeske | 5/481 X |
| 4,016,807 | 4/1977 | Schellenberg | 156/216 X |

Primary Examiner—Victor N. Sakran
Assistant Examiner—Peter R. Brown
Attorney, Agent, or Firm—George R. Nimmer

[57] ABSTRACT

Upholsterable base for seating furniture comprises a plurality of very low-density and light-weight foam panels including a pair of upright arm-panels and at least one intervening-panel wherein inter-panels angularity is maintained with opposed "angleiron-type" stiffener connections provided by flexible fabric sheeting adhered to the meeting foam panels. Thus, non-resilient inflexible framework is unnecessary for maintaining the armrests and backrest upright and perpendicular to each other. The fabric sheeting type stiffener connections are of low airflow permeability so as to prevent foam panel decompression by the seated occupant, though such stiffener connections are located below the armresting top-edge so as to enhance occupant comfort.

12 Claims, 7 Drawing Figures

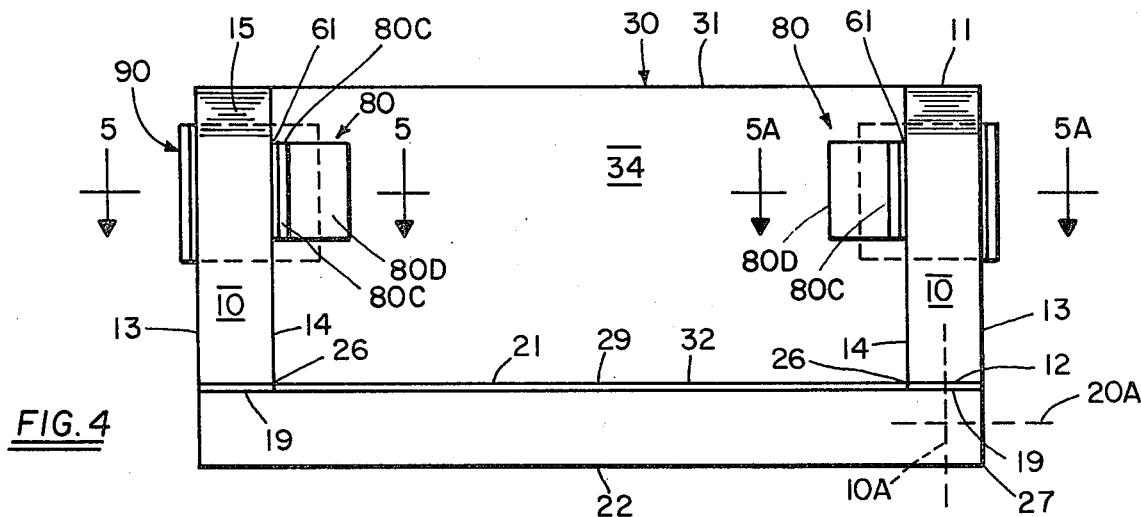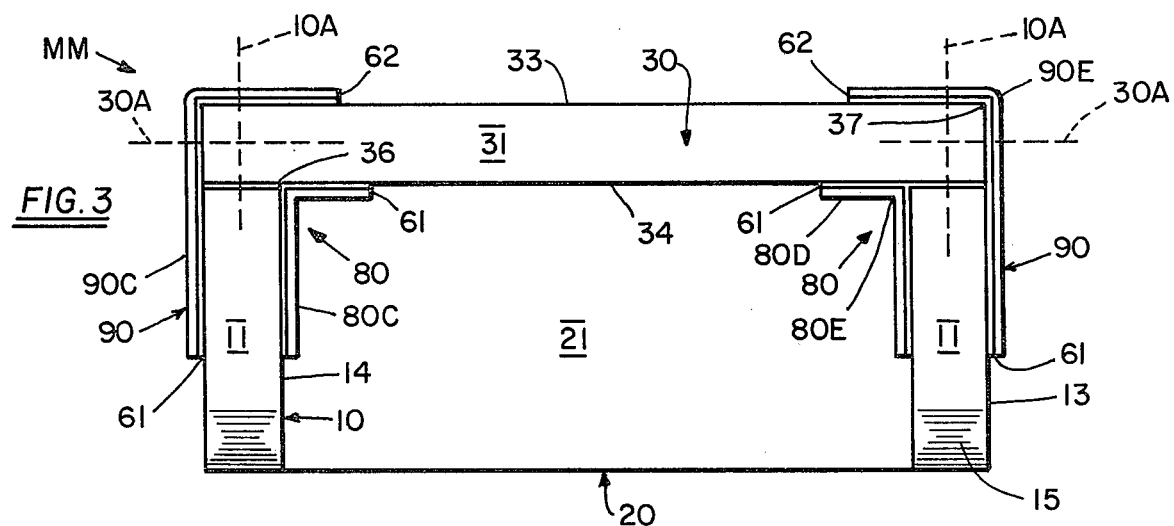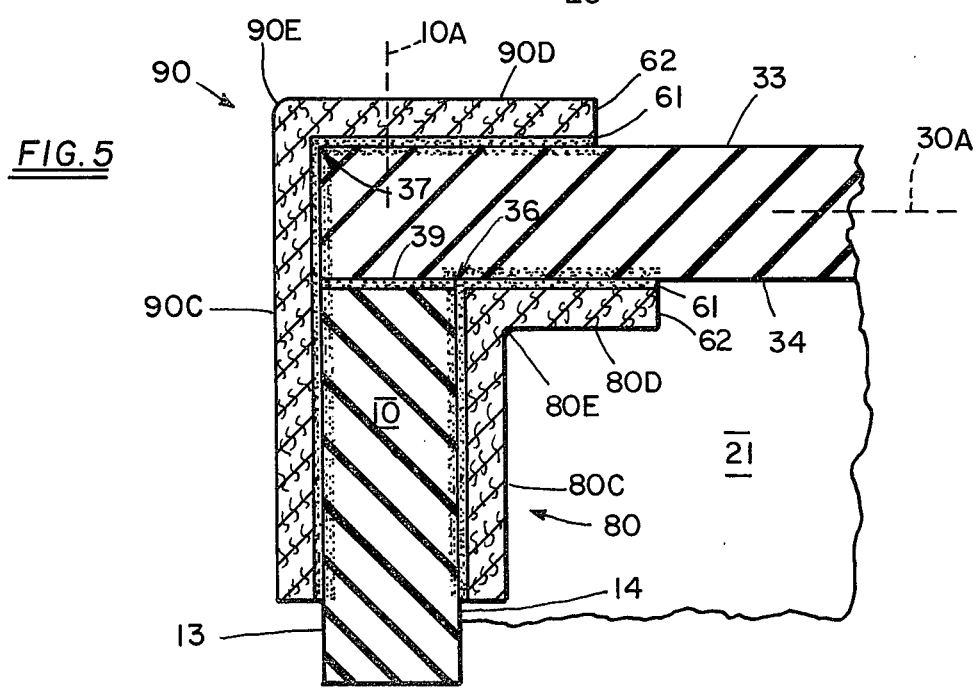

FRAMELESS FOAM BASE FOR UPHOLSTERED SEATING FURNITURE AND METHOD

BACKGROUND OF THE INVENTION

For the upholsterable base of seating furniture, upright panels of polyurethane or other low-density resiliently-compressive foam are utilized along the armrests and intervening backrest portions. As typified by U.S. Pat. No. 3,081,130, wood, metallic, or other non-resilient inflexible framework has been traditionally employed to uprightly support the occupant bearing foam panels. However, in recent years, there has been the quest to lessen the amount of the supporting framework whereby the seating is more readily portable and manufacturing cost is reduced.

Though it would be idealic to totally eliminate the non-resilient inflexible supporting framework from foam base seating, such has not been practical heretofore. For example, upright foam panels having the low-density consistent with high resiliency for occupant comfort inherently lack structural strength; thus, such low-density foam panels are undesireably readily deflectable away from the seated occupant, especially at the upright armrest foam panels. If the upright foam panels are selected of high-density, the inherently higher structural strength might adequately resist deflection away from the seated occupant; however, such high-density foam panels are insufficiently resiliently-compressive and offer uncomfortable hardness to the seated occupant. Moreover, such high-density foam panels are economically prohibitive, exceeding the cost of the inflexible supporting frameworks sought to be eliminated.

OBJECTS

It is accordingly the general objective of the present invention to provide upholsterable base for seating furniture wherein the base along the upright armrests and intervening backrest is provided by low-density resiliently-compressive foam panels without the ancillary use of inflexible rigid supporting framework along said armrests and backrest. Related general objectives include making economic use of unusually low-density and light-weight foam panels without concommitant introduction of inimical panel decompression by the seated occupant, and providing processes for manufacturing such frameless foam base for upholsterable seating furniture.

SUMMARY OF THE INVENTION

With the above and other objects and advantages in view, which will become more apparent as this description proceeds, the frameless foam base for furniture seating includes angularity maintenance means tending to maintain the angularity between the upright foam panels forming the armrests and intervening panels of the furniture base, the angularity maintenance means comprising flexible sheets of stretch-resistent fabric ultimately providing two adhesively applied "angleiron-type" stiffener connections between each foam arm-panel and an intersecting intervening-panel, said "angle-iron-type" connections preferably utilizing non-woven stretch-resistant flexible fabric having low permeability to airflow whereby economical upright foam panels of unusually low-density and high-porosity might be employed without exhibiting decompression during seating use, the "angleiron-type" connections being of low elevation to enhance armresting comfort, together with novel method steps for accomplishing frameless foam base seating.

BRIEF DESCRIPTION OF THE DRAWINGS

In the drawing, wherein like characters refer to like parts in the several views, and in which:

FIG. 3 is a top plan view of a second embodiment wherein the seating is of the backrest style;

FIG. 4 is a frontal elevational view of the second embodiment;

FIG. 5 is a sectional plan view taken along line 5—5 of FIG. 4 and is a mirror image of a sectional plan view (not shown) taken along line 5A—5A of FIG. 4;

DETAILED DESCRIPTION OF THE DRAWINGS

Figure 1:
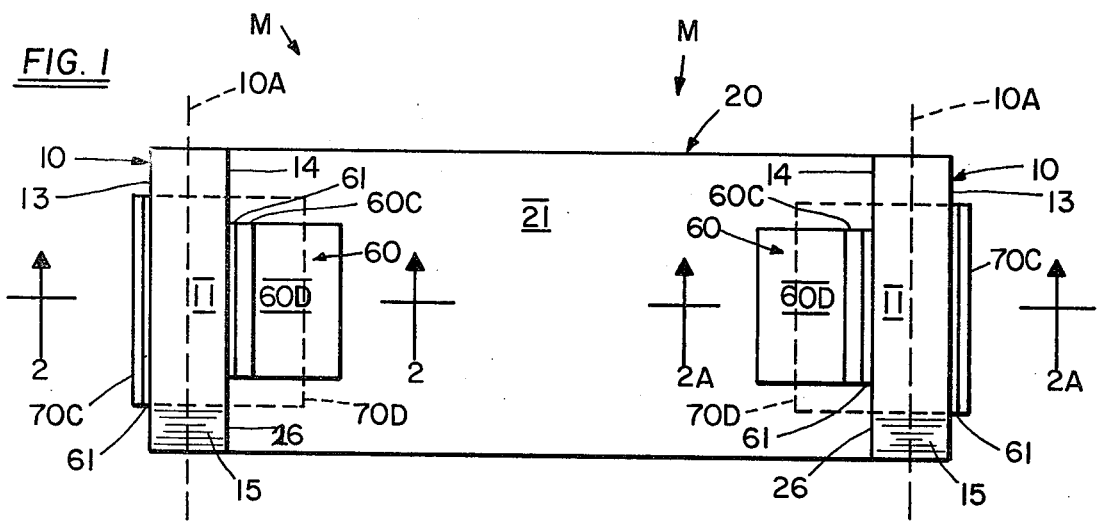
FIG. 1 is a top plan view of a first embodiment of the frameless foam base construction of the present invention wherein the seating is of the backless style.
Figure 2:
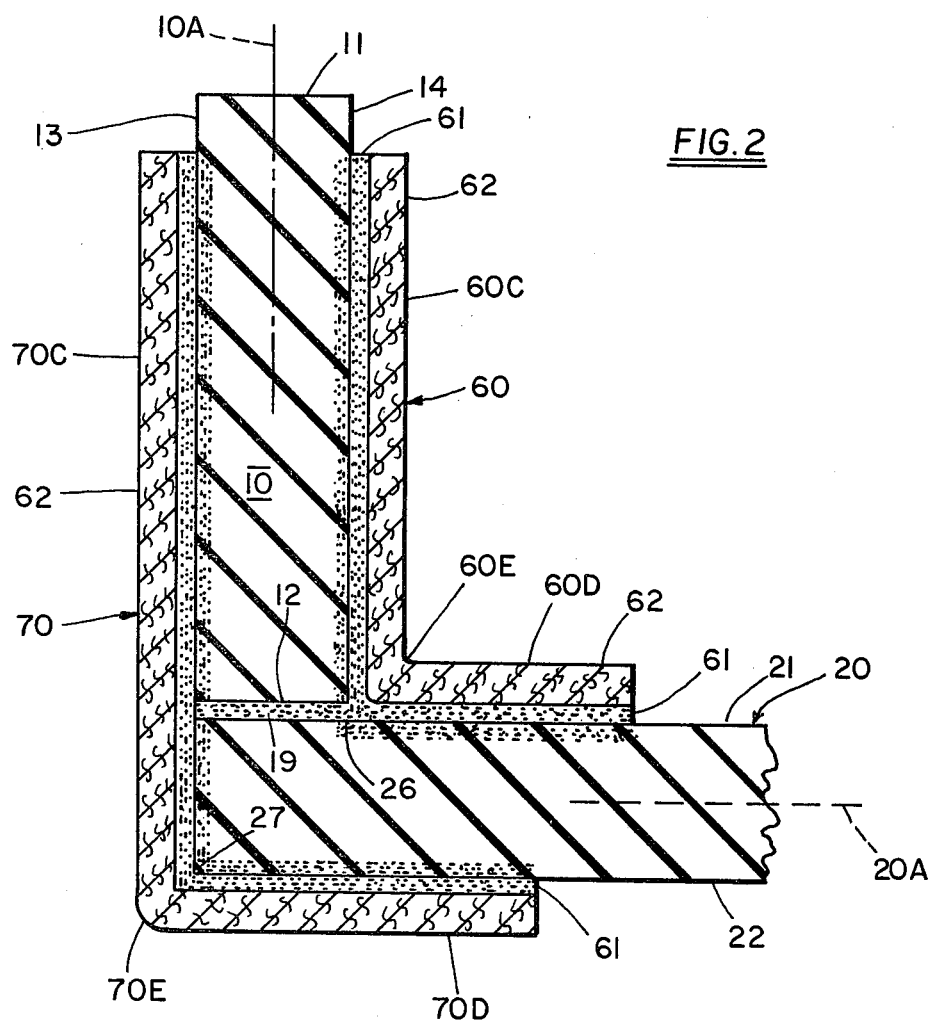
FIG. 2 is a sectional elevational view taken along line 2—2 of FIG. 1 and a mirror image of a sectional elevational view (not shown) taken along line 2A—2A of FIG. 1.

First embodiment "M" depicted in FIGS. 1 and 2 comprises a pair of upright arm-panels 10 of resiliently-compressive polyurethane foam material that is of low-density within the range of about one to one and one-half pounds per cubic foot. Each arm-panel 10 extends along a vertical-plane 10A and has a pair of upright planar surfaces including an outward-surface 13 remote from a foam intervening-panel (e.g. 20, 30) and an inward-surface 14 closer to and preferably adhesively joined to the intervening-panel. The arm-panel thickness 13-14 is within the range of three to five inches and preferably four inches when the preferred lowest-density is employed. Each upright arm-panel 10 also includes as the primary armresting surfaces a substantially horizontal top-edge 11 and a curved-edge 15. For "backless" embodiment "M", the foam intervening-panel takes the form of a rectangular shelf-panel 20 extending along a horizontal-plane 20A and having a pair of horizontal planar surfaces including an upper-surface 21 and a floor-resting lower-surface 22. The bottom-edge 12 of each arm-panel is joined with adhesive 19 to shelf-panel upper-surface 21 whereby for each arm-panel and the abutting intersecting shelf-panel there is a horizontal interior-angle 26 and a horizontal exterior-angle 27.

The angularity between the plane 10A of each arm-panel and the plane 20A of shelf-panel 20n is maintained with a pair of opposed "angleiron-type" stiffener connections including an internal-angleiron 60 at interior-angle 26 and an external-angleiron 70 at exterior-angle 27. Each "angleiron-type" stiffener connection comprises flexible fabric sheeting 62 attached with adhesive 61 to appropriate surfaces of the intersecting panels, said adhesive 61 permeating the interstices of the fabric 62 and the foam panels 10 and 20. Internal-angleiron 60 has a leg 60C extending vertically along inward-surface 14 and a leg 60D extending horizontally along upper-surface 21 whereby the internal-angleiron corner 60E is horizontal and lies alongside interior-angle 26. External-angleiron 70 has a leg 70C extending vertically along outward-surface 13 and a leg 70D extending horizontally along lower-surface 22 whereby the external-angleiron corner 70E is horizontal and lies alongside exterior-angle 27. In addition to maintaining the angularity between the arm-panels and the intervening panel, the adhesively attached flexible fabric sheeting as 60 and 70 also provides low permeability to airflow whereby the low-density light-weight foam arm-panels 10 are resistent to decompression whenever the seated occupant bears weight against the arm-panels. However, the internal-angleirons 60 should terminate some finite distance below top-edge 11 and remote from curved-edge 15 so as to enhance armresting comfort for the seated occupant. It is readily seen that non-resilient inflexible framework is not employed in embodiment "M" for the purposes of maintaining the angularity between foam panels 10 and 20.

Second embodiment "MM" of FIGS. 3–5 differs from the "backless" embodiment "M" in that embodiment "MM" includes upright back-panel 30 as the foam intervening-panel which is tied to both arm-panels 10 with the "angleiron-type" stiffener connections. Rectangular back-panel 30 extends along a vertical-plane 30A, has a pair of upright planar surfaces including front-surface 34 and rear-surface 33, a horizontal upper-edge 31, and a horizontal lower-edge 32 which is joined with adhesive strip 29 to shelf-panel upper-surface 21. Upright adhesive strips 39 join the upright extremities of back-panel 30 to the arm-panels 10 whereby for each arm-panel 10 and the abutting back-panel 30 there is a vertical interior-angle 36 and a vertical exterior-angle 37. The back-panel thickness 33–34 is within the range of three to five inches and desireably four inches when said preferred lower-density foam is employed.

The angularity between the plane 10A of each arm-panel and the plane 30A of back-panel 30 is maintained with the "angleiron-type" stiffener connections 60 and 70, but instead characterized as 80 and 90 in FIGS. 3–5 because they differ from connections 60 and 70 in the following two respects:

(a) connectors 80 and 90 are adhered to back-panel 30 instead of to horizontal shelf-panel 20, and hence,
(b) connectors 80 and 90 have vertical (rather than horizontal) corners 80E and 90E.

Specifically, internal-connector 80 has its legs 80C and 80D extending vertically along arm-panel inward-surface 14 and vertically along back-panel front-surface 34, respectively, whereby there is vertical corner 80E alongside interior-angle 36. Similarly, external-connector 90 has its legs 90C and 90D extending vertically along arm-panel outward-surface 13 and back-panel rear-surface 33, respectively, whereby there is vertical corner 90E alongside exterior-angle 37. Internal-angleirons 80 should terminate a finite distance below arm-panel top-edges 11 and below back-panel upper-edge 31 so as to enhance armresting and shoulderesting comfort for the seated occupant. It is readily seen that non-resilient inflexible framework is not employed for the purposes of maintaining the angularity between the upright foam panels 10 and 30.

Figures 6, 7:
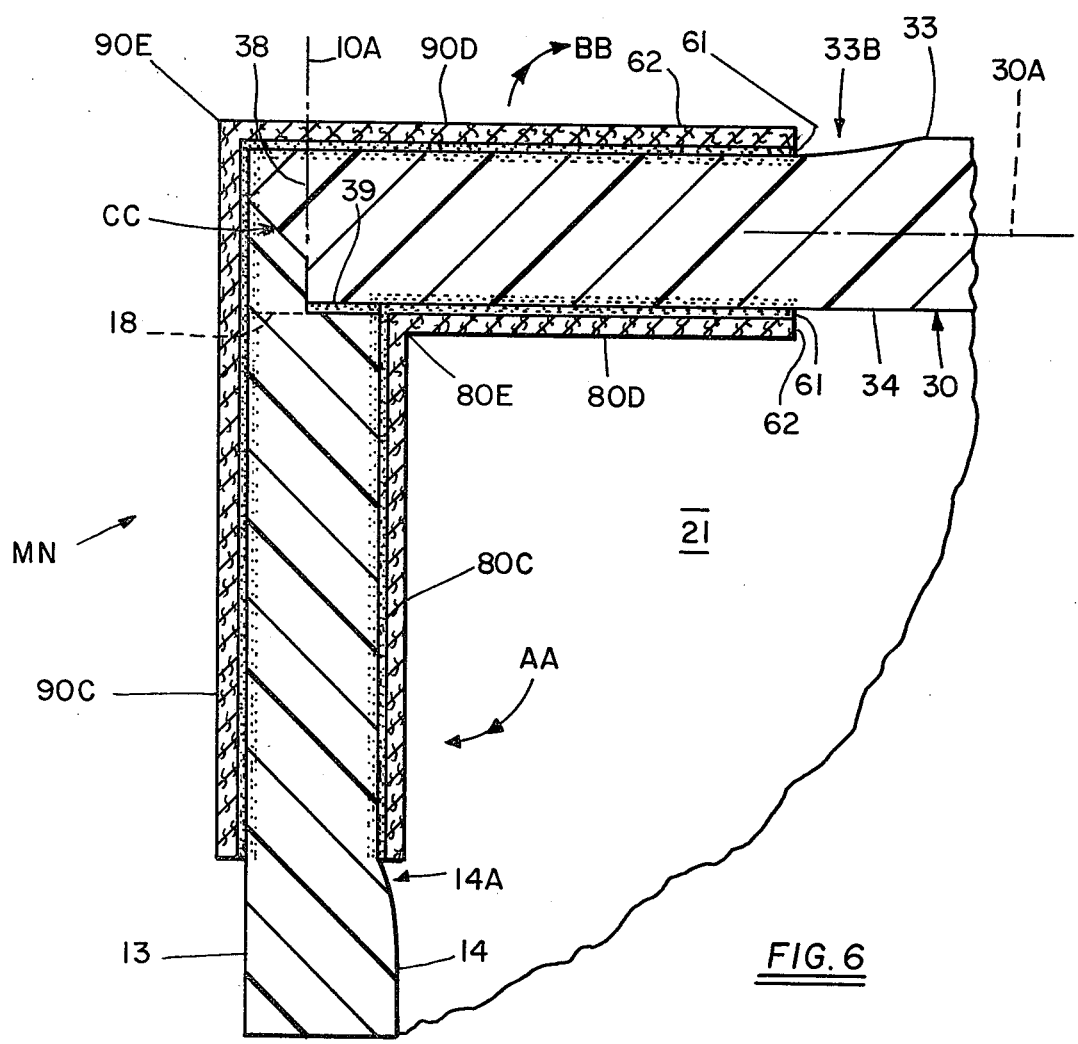
FIG. 6 is a sectional plan view similar to FIG. 5 of a modification to the second embodiment.
FIG. 7 is a flow diagram referring to method steps for making the frameless foam base seating.

FIG. 6 depicts a modification "MN" for second embodiment "MM" wherein the adhesively applied flexible fabric sheeting 61–62 providing the "angleiron-type" connectors stretch the intersecting foam panels in opposite directions so as to further reinforce the desired angularity therebetween. In this regard, and as indicated in phantom lines, prepatory to the installation of connectors 80 and 90, the arm-panel central-plane 10A lies beyond back-panel vertical-edge 38 and adhesive strip 39 is isolated to the inner portion of arm-panel vertical back-edge 18. For example, internal-connector leg 80C is first adhered (61) to arm-panel interior-surface 14, then stretched at 14A before leg 80D is adhered (61) to back-panel front-surface 34. The unrelieved stress at 14A exerts a clockwise force "AA" upon arm-panel 10 about interior-angle 36 (39) and bulges back-panel edge 38 to assume condition "CC". Next, external-angleiron leg 90D is first adhered (61–62) to back-panel rear-surface 33, then stretched at 33B before leg 90C is adhered (61–62) to arm-panel outward-surface 13; the unrelieved stress at 33B exerts a counterclockwise force "BB" upon arm-panel 10 about interior-angle 36 (39) and bulges arm-panel edge 18 to assume abutting condition at "CC". Ideally, panel stretches 14A and 33B are substantially identical whereby forces "AA" and "BB" are balanced and asserted at vertical abutment line "CC" thereby augmenting the desired angularity between foam panels 10 and 20.

For embodiments "M" and "MM," and especially for embodiment "MN," the flexible fabric sheeting 62 preferably takes the form of stretch-resistant non-woven fabric comprising randomly disposed resinous filament such as "Dacron," "Nylon," "Typar," etc. Basis weight for the flexible fabric sheeting 62 should be at least six ounces per square foot. So as to provide the low permeability to airflow through adhered sheeting 62, the sheeting can be heavily impregnated with adhesive 61, or using fabric basis weight of about fourteen ounces per square foot filament without adhesive impregnation, or an empirically selected combination of intermediate fabric and adhesive basis weights. Adhesive material 61 is empirically selected for compatibility with both the foam panels 10 e.g. polyurethane, and the fabric filament e.g. "Typar;" in this vein, "Audel A1001," "3M Foam Adhesive," etc., might be advantageously employed.

FIG. 7 is a flow diagram referring to the basic method steps for providing the foam base for furniture seating which does not employ non-resilient inflexible framework of the prior art for the purposes of maintaining the upright condition of foam arm-panels (10) with respect to the intervening-panels(20, 30). As the first method step, the two foam arm-panels 10 are adherently joined to at least one foam intervening-panel with lengthy adhesive strips e.g. 19, 29, 39. Then, the flexible fabric sheets (62) are adhered (61) as a pair of opposed "angleiron-type" connectors e.g. 60 & 70, 80 & 90, between each foam arm-panel 10 and an intersecting intervening-panel e.g. 20, 30. Preferably, the method step suggested by FIG. 6 is also employed to further reinforce the angularity between each foam arm-panel and the intersecting intervening-panel.

From the foregoing, the construction and operation of the frame-less foam base for upholstered furniture and method will be readily understood and further explanation is believed to be unnecessary. However, since numerous modifications and changes will readily occur to those skilled in the art, it is not desired to limit the invention to the exact constructions shown and described, and accordingly, all suitable modifications and equivalents may be resorted to, falling within the scope of the appended claims.

What is claimed is as follows:

1. Foam base for furniture seating comprising a plurality of angularly intersecting panels of low-density resiliently-compressive foam material, said plurality of foam panels including a spaced apart pair of upright arm-panels and at least one intersecting-panel, each upright arm-panel including a non-vertical top-edge and a pair of upright surfaces including an outward-surface remote from the intervening-panel and an inward-surface closer to the intervening-panel, the angularity between each upright arm-panel and the intervening-panel being maintained with opposed angular stiffener connections including an internal-angle connector and an external-angle connector located respectively at the interior-angle and at the exterior-angle formed by each arm-panel and an intervening panel, each angular stiffener connection being provided by flexible fabric sheeting adhered to the arm-panel and to the intervening-panel, said adhesively attached fabric sheeting being of low permeability to airflow so to also, in addition to providing angularity maintenance means, provide a barrier to airflow whereby the arm-panel is resistent to decompression whenever the furniture occupant bears his weight against the arm-panel, and each said internal-angle connector being wholly relegated in elevation a finite distance below the armresting top-edge of the upright arm-panel so as to enhance comfort to the seated occupant's arm resting downwardly thereagainst.

2. The foam base seating of claim 1 wherein the arm-panels are of polyurethane foam having a thickness from inward-surface to outward-surface within the range of three to five inches and having a density within the range of substantially one to one and one-half pounds per cubic foot.

3. The foam base seating of claim 2 wherein the intervening-panel is a shelf-panel having a substantially horizontal upper-surface and a substantially horizontal lower-surface; wherein the internal-angleconnector extends vertically along the arm-panel inward-surface and horizontally along the shelf-panel upper-surface; and wherein the external-angleconnector extends vertically along the arm-panel outward-surface and horizontally along the shelf-panel lower-surface.

4. The foam base seating of claim 2 wherein the intervening panel is an upright back-panel having an upright front-surface, an upright rear-surface, and a substantially horizontal upper-edge; wherein the internal-angleconnector extends vertically along both the arm-panel inward-surface and the back-panel front-surface; and wherein the external-angleconnector extends vertically along both the arm-panel outward-surface and the back-panel rear-surface.

5. The foam base seating of claim 4 wherein each internal-angleconnector is wholly relegated in elevation below the back-panel upper-edge.

6. The foam base seating of claim 5 wherein there is a shelf-panel of resiliently-compressive foam material adhesively connected to the arm-panels and to the back-panel, said shelf-panel including a substantially horizontal upper-surface located in elevation below the internal-angleconnector.

7. The foam base seating of claim 6 wherein the back-panel is of polyurethane foam having a thickness from front-surface to rear-surface within the range of three to five inches and having a density within the range of substantially one to one and one-half pounds per cubic foot; and wherein the seating is wholly devoid of inflexible supporting framework whereby the angularity between the arm-panels and the back-panel is maintained soley by virtue of the angular stiffener connections consisting of adhesively attached fabric sheeting.

8. The foam base seating of claim 2 wherein at the angularly intersecting arm-panel and intervening-panel, the paired team of internal-angleconnector and external-angleconnector exert opposite directional tension accompanied by abutting bulging of the meeting panels.

9. The foam base seating of claim 2 wherein the flexible fabric sheeting comprises non-woven stretch-resistant flexible fabric wherein the randomly disposed fabric filamentary material is impregnated with resinous material filling the filamentary interstices.

10. The foam base seating of claim 9 wherein the basis weight for the non-woven fabric filamentary material is within the range of substantially six to fourteen ounces per square foot and; wherein the arm-panel thickness is substantially four inches and the arm-panel density is substantially one pound per cubic foot.

11. Method for making foam base seating comprising a plurality of low-density and resiliently-compressive foam material panels including a pair of spaced apart upright arm-panels and at least one intersecting intervening-panel, the angularity between the arm-panels and said intervening-panel being maintainable for seating use without the inclusion of inflexible supporting framework, said method comprising the following steps in order:

(a) adhering each intervening-panel to both arm-panels whereby at each such intersected arm-panel there is an internal-corner and an external-corner; and (b) adhering flexible fabric sheeting to the internal-corner and also to the external-corner to respectively provide an internal-angleconnector and an external-angleconnector as angular stiffener connections.

12. The method of claim 11 wherein one of the two angleconnectors is applied so as to stretch one of the intersecting panels and the other connection is applied so as to stretch the other intersecting panel thereby resulting in opposite directional tension on the two intersecting panels accompanied by abutting bulging where the two intersecting panels meet.

* * * * *